(12) United States Patent
Miao et al.

(10) Patent No.: US 9,967,824 B2
(45) Date of Patent: May 8, 2018

(54) MOBILE TERMINAL MANAGING METHOD AND SYSTEM, MOBILE TERMINAL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jinghua Miao, Beijing (CN); Lili Chen, Beijing (CN); Xue Dong, Beijing (CN); Wei Sun, Beijing (CN); Mubing Li, Beijing (CN); Jianjie Wu, Beijing (CN); Ruifeng Qin, Beijing (CN); Bin Zhao, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days. days.

(21) Appl. No.: 15/264,869

(22) Filed: Sep. 14, 2016

(65) Prior Publication Data
US 2017/0195969 A1 Jul. 6, 2017

(30) Foreign Application Priority Data
Jan. 5, 2016 (CN) .......................... 2016 1 0005216

(51) Int. Cl.
*H04W 52/02* (2009.01)
*G06F 1/32* (2006.01)

(52) U.S. Cl.
CPC ... *H04W 52/0261* (2013.01); *H04W 52/0251* (2013.01); *G06F 1/3212* (2013.01);
(Continued)

(58) Field of Classification Search
CPC .... G06F 1/3203; G06F 1/3206; G06F 1/3212; G06F 1/3234; G06F 1/3246;
(Continued)

(56) References Cited

U.S. PATENT DOCUMENTS 7,725,094 B2 * 5/2010 Chary ................... G06F 1/3203
455/343.2
8,135,443 B2 * 3/2012 Aleksic ................... H02J 9/002
320/120
(Continued)

FOREIGN PATENT DOCUMENTS

| CN | 101523690 A | 9/2009 |
| CN | 104781752 A | 7/2015 |

OTHER PUBLICATIONS

Chinese Office Action in Chinese Application No. 201610005216.6, dated Dec. 12, 2017 with English translation.

*Primary Examiner* — Duc M Nguyen
(74) *Attorney, Agent, or Firm* — Collard & Roe, P.C.

(57) ABSTRACT

Provided are a mobile terminal management method, a mobile terminal management system, and a mobile terminal. Said mobile terminal management method comprises: acquiring a desired endurance time length; predicting an endurance time length according to a current power consumption rate and a current state of charge of a battery; judging whether a power consumption rate needs to be reduced according to the desired endurance time length and the predicted endurance time length; when it is judged that the power consumption rate needs to be reduced, determining a power consumption reducing scheme according to the desired endurance time length and the predicted endurance time length; and managing a mobile terminal according to the determined power consumption reducing scheme. In this disclosure, the user can set a desired endurance time length;
(Continued)

using requirements of the user on the mobile terminal are satisfied as much as possible while saving power.

34 Claims, 4 Drawing Sheets

(52) U.S. Cl.
CPC ....... *G06F 1/3234* (2013.01); *H04W 52/0274* (2013.01); *Y02B 60/50* (2013.01)

(58) Field of Classification Search
CPC ............. H04W 52/02; H04W 52/0209; H04W 52/0264; H04W 52/0274; H04W 52/0277
See application file for complete search history.

(56) References Cited

U.S. PATENT DOCUMENTS

| | | | | |
|---|---|---|---|---|
| 8,244,311 B2* | 8/2012 | Boss | ................. | H04W 52/0264 455/573 |
| 8,380,999 B1* | 2/2013 | Robison | ............ | H04W 52/0261 320/120 |
| 8,515,499 B1* | 8/2013 | Stekkelpak | ....... | H04M 1/72569 455/343.5 |
| 9,210,662 B1* | 12/2015 | Brown | .............. | H04W 52/0261 |
| 9,247,502 B2* | 1/2016 | Xie | .................... | H04W 52/0261 |
| 9,338,749 B2* | 5/2016 | Kim | .................. | H04W 52/0254 |
| 2008/0057894 A1* | 3/2008 | Aleksic | ................... | H02J 9/002 455/187.1 |
| 2010/0151918 A1* | 6/2010 | Annambhotla | .... | G01R 31/3648 455/573 |
| 2011/0159931 A1* | 6/2011 | Boss | ................. | H04W 52/0264 455/574 |
| 2011/0291748 A1* | 12/2011 | Li | .......................... | G06F 1/3228 327/544 |
| 2012/0315960 A1* | 12/2012 | Kim | .................. | H04W 52/0254 455/574 |
| 2014/0075234 A1* | 3/2014 | Stekkelpak | ....... | H04M 1/72569 713/340 |
| 2014/0195826 A1* | 7/2014 | Wojcik | ................. | H05K 5/0086 713/300 |
| 2015/0077127 A1* | 3/2015 | Fu | ......................... | G06F 1/3212 324/428 |
| 2015/0293575 A1* | 10/2015 | Hampson | .............. | G06F 1/3212 713/323 |
| 2015/0323974 A1* | 11/2015 | Shuster | ............. | H04M 1/72563 713/320 |
| 2016/0150072 A1* | 5/2016 | Rangarajan | ........... | H04W 4/003 455/574 |

\* cited by examiner

FIG. 5

MOBILE TERMINAL MANAGING METHOD AND SYSTEM, MOBILE TERMINAL

CROSS REFERENCE TO RELATED APPLICATIONS

Applicant claims priority under 35 U.S.C. § 119 of Chinese Application No. 201610005216.6 filed on Jan. 5, 2016, the disclosure of which is incorporated by reference.

TECHNICAL FIELD

The present disclosure relates to a field of mobile terminal management technique, and more particularly, to a mobile terminal management method, a mobile terminal management system, and a mobile terminal.

BACKGROUND

In recent years, market share of large-screen high-resolution smart mobile terminals gradually increases, a problem of power consumption gradually stands out while bringing new viewing experience, endurance time has become a significant indicator for large-screen high-resolution smart mobile terminals, and how to reduce power consumption of mobile terminals has become an unavoidable problem. Especially, when a user is in the open or go outdoors temporarily, if the user carries no mobile power supply, how to hold on long enough with a limited amount of power has become a big challenge.

In face of such challenge, applications for managing power supplies and mobile terminals having a power saving mode just came into being. These applications or mobile terminals meet the power saving requirement, however, since some applications are forced to shutdown for saving power, user experience is greatly decreased.

SUMMARY

The technical problem addressed by the present disclosure is how to improve user experience while saving power.

In order to solve the above technical problem, the present disclosure provides a mobile terminal management method, a mobile terminal management system, and a mobile terminal.

In a first aspect, a mobile terminal management method provided by the present disclosure comprises: acquiring a desired endurance time length set by a user; predicting an endurance time length according to a current power consumption rate and a current state of charge of a battery; judging whether a power consumption rate needs to be reduced according to magnitude relationship between the desired endurance time length and the predicted endurance time length; when it is judged that the power consumption rate needs to be reduced, determining a power consumption reducing scheme according to the desired endurance time length and the predicted endurance time length; and managing a mobile terminal according to the determined power consumption reducing scheme.

Optionally, the mobile terminal management method further comprises: when it is judged that the power consumption rate does not need to be reduced, re-judging whether the power consumption rate needs to be reduced according to a state of charge at a first predetermined time length after predicting the endurance time length and a state of charge when predicting the endurance time length; when it is re-judged that the power consumption rate needs to be reduced, determining a power consumption reducing scheme according to the state of charge at the first predetermined time length after predicting the endurance time length and the state of charge when predicting the endurance time length; and managing the mobile terminal according to the determined power consumption reducing scheme.

Optionally, said re-judging whether the power consumption rate needs to be reduced according to a state of charge at a first predetermined time length after predicting the endurance time length and a state of charge when predicting the endurance time length comprises: judging whether a first ratio of the state of charge at the first predetermined time length after predicting the endurance time length to the state of charge when predicting the endurance time length is smaller than a first preset ratio; a ratio of the first predetermined time length to the desired endurance time length being a second preset ratio, a sum of the first preset ratio and the second preset ratio being 1; and when the first ratio is smaller than the first preset ratio, judging that the power consumption rate needs to be reduced.

Optionally, said determining a power consumption reducing scheme comprises: determining a plurality of power consumption reducing schemes; and said managing a mobile terminal according to the determined power consumption reducing scheme comprises: presenting the plurality of power consumption reducing schemes to the user, receiving a user selection, and managing the mobile terminal according to a power consumption reducing scheme selected by the user.

Optionally, said determining a power consumption reducing scheme according to the desired endurance time length and the predicted endurance time length comprises: determining the power consumption reducing scheme according to a ratio of the desired endurance time length to the predicted endurance time length, the ratio of the desired endurance time length to the predicted endurance time length being positively correlated with a degree to which the power consumption reducing scheme can reduce the power consumption rate.

Optionally, said predicting an endurance time length according to a current power consumption rate and a current state of charge of a battery comprises: predicting a maximum endurance time length and a minimum endurance time length according to the current power consumption rate and the current state of charge of the battery; said judging whether a power consumption rate needs to be reduced according to the desired endurance time length and the predicted endurance time length comprises: when the desired endurance time length is larger than or equal to the maximum endurance time length, judging that the power consumption rate needs to be reduced; and said determining a power consumption reducing scheme according to the desired endurance time length and the predicted endurance time length comprises: determining the power consumption reducing scheme according to the desired endurance time length and the maximum endurance time length and/or the minimum endurance time length.

Optionally, said judging whether a power consumption rate needs to be reduced according to magnitude relationship between the desired endurance time length and the predicted endurance time length further comprises: when the desired endurance time length is smaller than the maximum endurance time length and larger than the minimum endurance time length, presenting a first window to the user, the first window being used to indicate the user to choose whether to reduce the power consumption rate; receiving a user selection; and when the user selects to reduce the power consumption rate, judging that the power consumption rate needs to be reduced.

Optionally, said managing a mobile terminal according to the determined power consumption reducing scheme comprises: judging whether a second ratio of the state of charge at a second predetermined time length after managing is started to the state of charge when predicting the endurance time length is smaller than a third preset ratio; a ratio of the second predetermined time length to the desired endurance time length being a fourth preset ratio, a sum of the third preset ratio and the fourth preset ratio being 1; when it is judged that the second ratio is smaller than the third preset ratio, re-determining a power consumption reducing scheme; a degree to which the re-determined power consumption reducing scheme can reduce the power consumption rate is higher than a degree to which the power consumption reducing scheme determined according to the desired endurance time length and the predicted endurance time length can reduce the power consumption rate; and managing the mobile terminal according to the re-determined power consumption reducing scheme.

Optionally, said re-determining a power consumption reducing scheme comprises: re-determining a plurality of power consumption reducing schemes; said managing the mobile terminal according to the re-determined power consumption reducing scheme comprises: presenting the plurality of re-determined power consumption reducing schemes to the user, receiving a user selection, and managing the mobile terminal according to a power consumption reducing scheme selected by the user.

In a second aspect, a mobile terminal management system provided by the present disclosure comprises: an acquiring module for acquiring a desired endurance time length set by a user; a predicting module for predicting an endurance time length according to a current power consumption rate and a current state of charge of a battery; a first judging module for judging whether a power consumption rate needs to be reduced according to the desired endurance time length and the predicted endurance time length; a first determining module for, when it is judged that the power consumption rate needs to be reduced, determining a power consumption reducing scheme according to the desired endurance time length and the predicted endurance time length; and a first managing module for managing a mobile terminal according to the power consumption reducing scheme determined by the first determining module.

Optionally, the mobile terminal management system further comprises: a second judging module for, when it is judged that the power consumption rate does not need to be reduced, re-judging whether the power consumption rate needs to be reduced according to a state of charge at a first predetermined time length after predicting the endurance time length and a state of charge when predicting the endurance time length; a second determining module for, when it is re-judged that the power consumption rate needs to be reduced, determining a power consumption reducing scheme according to the state of charge at the first predetermined time length after predicting the endurance time length and the state of charge when predicting the endurance time length; and a second managing module for managing the mobile terminal according to the power consumption reducing scheme determined by the second determining module.

Optionally, the second judging module is for: judging whether a first ratio of the state of charge at the first predetermined time length after predicting the endurance time length to the state of charge when predicting the endurance time length is smaller than a first preset ratio; a ratio of the first predetermined time length to the desired endurance time length being a second preset ratio, a sum of the first preset ratio and the second preset ratio being 1; and when the first ratio is smaller than the first preset ratio, judging that the power consumption rate needs to be reduced.

Optionally, said determining a power consumption reducing scheme in the first determining module and/or the second determining module comprises: determining a plurality of power consumption reducing schemes; said managing a mobile terminal according to the determined power consumption reducing scheme in the first managing module and/or the second managing module comprises: presenting the plurality of power consumption reducing schemes to the user, receiving a user selection, and managing the mobile terminal according to a power consumption reducing scheme selected by the user.

Optionally, said determining a power consumption reducing scheme according to the desired endurance time length and the predicted endurance time length in the first determining module comprises: determining the power consumption reducing scheme according to a ratio of the desired endurance time length to the predicted endurance time length, the ratio of the desired endurance time length to the predicted endurance time length being positively correlated with a degree to which the power consumption reducing scheme can reduce the power consumption rate.

Optionally, the predicting module is for predicting a maximum endurance time length and a minimum endurance time length according to the current power consumption rate and the current state of charge of the battery; the first judging module is for, when the desired endurance time length is larger than or equal to the maximum endurance time length, judging that the power consumption rate needs to be reduced; and the first determining module is for determining the power consumption reducing scheme according to the desired endurance time length and the maximum endurance time length and/or the minimum endurance time length.

Optionally, the first judging module is further for: when the desired endurance time length is smaller than the maximum endurance time length and larger than the minimum endurance time length, presenting a first window to the user, the first window being used to indicate the user to choose whether to reduce the power consumption rate; receiving a user selection; and when the user selects to reduce the power consumption rate, judging that the power consumption rate needs to be reduced.

Optionally, the first managing module is further for: judging whether a second ratio of the state of charge at a second predetermined time length after managing is started to the state of charge when predicting the endurance time length is smaller than a third preset ratio; a ratio of the second predetermined time length to the desired endurance time length being a fourth preset ratio, a sum of the third preset ratio and the fourth preset ratio being 1; when it is judged that the second ratio is smaller than the third preset ratio, re-determining a power consumption reducing scheme; a degree to which the re-determined power consumption reducing scheme can reduce the power consumption rate is higher than a degree to which the power consumption reducing scheme determined according to the desired endurance time length and the predicted endurance time length can reduce the power consumption rate; and managing the mobile terminal according to the re-determined power consumption reducing scheme.

Optionally, said re-determining a power consumption reducing scheme in the first managing module comprises: re-determining a plurality of power consumption reducing schemes; said managing the mobile terminal according to the re-determined power consumption reducing scheme in the first managing module comprises: presenting the plurality of re-determined power consumption reducing schemes to the user, receiving a user selection, and managing the mobile terminal according to a power consumption reducing scheme selected by the user.

In a third aspect, a mobile terminal provided by the present disclosure comprises any of the mobile terminal managing system described above.

In the mobile terminal management method and system, and the mobile terminal provided by the present disclosure, the user can set a desired endurance time length on his/her own, the user has certain selectivity. And the power consumption reducing scheme is determined according to the desired endurance time length and the predicted endurance time length, a power consumption reduction scheme determined according to a different desired endurance time length or a different predicted endurance time length is different, using requirements of the user on the mobile terminal are satisfied as much as possible while saving power, thus user experience is improved greatly.

BRIEF DESCRIPTION OF THE DRAWINGS

Features and advantages of the present disclosure will be understood more clearly with reference to the accompanying drawings, the drawings are illustrative and should not be construed as any limitations to the present disclosure, wherein.

DETAILED DESCRIPTION OF THE EMBODIMENTS

In order to more clearly understand the above objectives, features and advantages of the present disclosure, the present disclosure will be described in further detail in combination with the accompanying drawings and the specific embodiments, in a case of having no conflict, the embodiments of the present disclosure and the features in the embodiments may be combined.

In the following description, many specific details are set forth for the present disclosure to be fully understood, however, the present disclosure may also be implemented in other ways different from the embodiments described herein, therefore, the protection scope of the present disclosure is not limited to the specific embodiments disclosed below.

Figure 1:
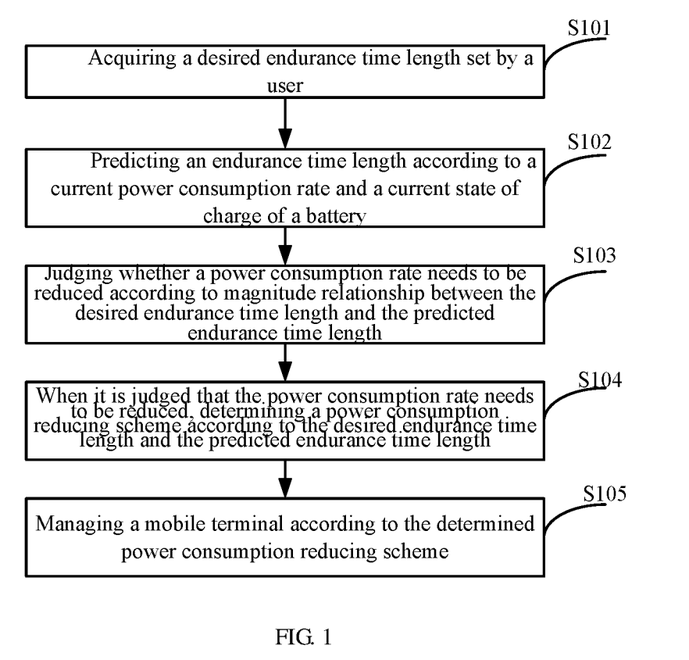
FIG. 1 is a schematic flowchart of an embodiment of the mobile terminal management method according to the present disclosure.

The present disclosure provides a mobile terminal management method, as shown in FIG. 1, said method comprises: step S101, acquiring a desired endurance time length set by a user; step S102, predicting an endurance time length according to a current power consumption rate and a current state of charge of a battery; step S103, judging whether a power consumption rate needs to be reduced according to magnitude relationship between the desired endurance time length and the predicted endurance time length; step S104, when it is judged that the power consumption rate needs to be reduced, determining a power consumption reducing scheme according to the desired endurance time length and the predicted endurance time length; and step S105, managing a mobile terminal according to the determined power consumption reducing scheme.

In the mobile terminal management method provided by the present disclosure, the user can set a desired endurance time length on his/her own, i.e., an endurance time length of the mobile terminal desired by the user, so the user can set according to his/her own needs, the user has certain selectivity. And the power consumption reducing scheme is determined according to the desired endurance time length and the predicted endurance time length, a power consumption reduction scheme determined according to a different desired endurance time length or a different predicted endurance time length is different. For example, if the desired endurance time length is 7 hours and the predicted endurance time length is 5 hours, some applications need to be shut down, to enable the mobile terminal to last out for the desired endurance time length. However, when the desired endurance time length is 5.5 hours and the predicted endurance time length does not change, it only needs to shut down several applications that are less commonly used. Thus, the present disclosure can satisfy using requirements of the user on the mobile terminal as much as possible while saving power, thus user experience is improved greatly.

In a specific implementation, it may be probably judged in step S103 that the power consumption rate does not need to be reduced, in this case, the mobile terminal management method according to an embodiment of the present disclosure may further execute the following steps: S106, when it is judged that the power consumption rate does not need to be reduced, re-judging whether the power consumption rate needs to be reduced according to a state of charge at a first predetermined time length after predicting the endurance time length and a state of charge when predicting the endurance time length; S107, when it is re-judged that the power consumption rate needs to be reduced, determining a power consumption reducing scheme according to the state of charge at the first predetermined time length after predicting the endurance time length and the state of charge when predicting the endurance time length; and S108, managing the mobile terminal according to the determined power consumption reducing scheme.

In practice, even if it is judged in step S103 that it does not need to reduce the power consumption rate, but with using of the mobile terminal, the remaining power may probably decrease rapidly, and cannot last out for the desired endurance time length, thus, monitoring is still performed during the desired endurance time length, specifically, it is re-judged whether it needs to reduce the power consumption rate according to the state of charge at one or several time points within the desired endurance time length and the state of charge when predicting the endurance time length, which further ensures that the endurance time length of the mobile terminal can last out for the desired endurance time length. And during the desired endurance time length of the mobile terminal, when it is judged that it needs to reduce the power consumption rate, the power consumption reducing scheme is determined according to the state of charge at the first predetermined time length after predicting the endurance time length and the state of charge when predicting the endurance time length, the determined power consumption scheme varies when the state of charge at the first predetermined time length is different, i.e., the power consumption reducing scheme is determined according to a power consumption state of the battery, thus the present disclosure satisfies using requirements of the user on the mobile terminal as much as possible while saving power, thus user experience is improved greatly.

In practice, for example, it may be re-judged whether the power consumption rate needs to be reduced according to a ratio of a state of charge at one or several time points within the desired endurance time length and the state of charge when predicting the endurance time length.

In this case, step S106 may comprise: judging whether a first ratio of the state of charge at the first predetermined time length after predicting the endurance time length to the state of charge when predicting the endurance time length is smaller than a first preset ratio; a ratio of the first predetermined time length to the desired endurance time length being a second preset ratio, a sum of the first preset ratio and the second preset ratio being 1; and when the first ratio is smaller than the first preset ratio, judging that the power consumption rate needs to be reduced.

In practice, it is assumed that the desired endurance time length is 5 hours, the first predetermined time length is 1 hour, then the second preset ratio is 0.2, the first preset ratio is 0.8, it is assumed that the state of charge when predicting the endurance time length is 80%, the state of charge at the first predetermined time length after predicting the endurance time length is 60%, after judgment it can be known that the ratio of the state of charge at the first predetermined time length to the state of charge when predicting the endurance time length is less than the first preset ratio 0.8, thus it needs to reduce the power consumption rate; if the state of charge at the first predetermined time length after predicting the endurance time length is 65%, after judgment it can be known that the ratio of the state of charge at the first predetermined time length to the state of charge when predicting the endurance time length is larger than the first preset ratio 0.8, thus it does not need to reduce the power consumption rate. Here, judging whether it needs to reduce the power consumption rate by way of a ratio has the advantages of being simple and fast.

In practice, said determining a power consumption reducing scheme in step S104 and/or step S107 may comprise determining a plurality of power consumption reducing schemes. In this case, correspondingly, said managing a mobile terminal according to the determined power consumption reducing scheme in step S105 and/or step S108 may comprise: presenting the plurality of power consumption reducing schemes to the user, receiving a user selection, and managing the mobile terminal according to a power consumption reducing scheme selected by the user.

In practice, even if the desired endurance time length and the predicted endurance time length are the same, different users may have different requirements on the mobile terminal, the present disclosure provides a plurality of power consumption reducing schemes, so that the user can select according to his/her own requirements, which further improves user experience.

In practice, said determining a power consumption reducing scheme according to the desired endurance time length and the predicted endurance time length in step S104 may comprise: determining the power consumption reducing scheme according to a ratio of the desired endurance time length to the predicted endurance time length, the ratio of the desired endurance time length to the predicted endurance time length being positively correlated with a degree to which the power consumption reducing scheme can reduce the power consumption rate.

It is easy to understand, the applications shut down by the power consumption reducing scheme determined when the desired endurance time length is 7 hours and the predicted endurance time length is 5 hours are more than the applications shut down by the power consumption reducing scheme determined when the desired endurance time length is 5.5 hours and the predicted endurance time length is 5 hours, i.e., a degree to which the former can reduce the power consumption rate is higher than a degree to which the latter can reduce the power consumption rate. In the present disclosure, a power consumption reducing scheme is determined according to a ratio of the desired endurance time length to the predicted endurance time length, a degree to which the determined power consumption reducing scheme can reduce the power consumption rate is positively correlated with said ratio, so as to ensure that the mobile terminal can last out for the desired endurance time length when satisfying user requirements as much as possible.

In practice, the current power consumption rate in step S102 may be determined according to using state data of the mobile terminal, specifically, distribution data of electricity that has been used may be extracted from the using state data, the current power consumption rate may be determined according to the distribution data, the current power consumption rate determined at this time may probably be a range, also, the endurance time length predicted according to the current power consumption rate and the current state of charge in step S102 may probably be a range, said range includes a maximum endurance time length and a minimum endurance time length. That is, predicting an endurance time length according to a current power consumption rate and a current state of charge of a battery in step S102 may comprise predicting a maximum endurance time length and a minimum endurance time length according to the current power consumption rate and the current state of charge of the battery.

When the predicted endurance time length includes a maximum endurance time length and a minimum endurance time length, there are three types of relationship between the desired endurance time length and the maximum endurance time length, the minimum endurance time length.

(1) The desired endurance time length is smaller than or equal to the predicted minimum endurance time length, in this case, it is judged in step S103 that it does not need to reduce the power consumption rate.

(2) The desired endurance time length is larger than the predicted minimum endurance time length and smaller than the predicted maximum endurance time length, in this case, the user may select whether it needs to reduce the power consumption rate according to his/her own needs, i.e., step S103 may specifically comprise, when the desired endurance time length is smaller than the maximum endurance time length and larger than the minimum endurance time length, presenting a first window to the user, the first window being used to indicate the user to choose whether to reduce the power consumption rate; receiving a user selection; and when the user selects to reduce the power consumption rate, judging that the power consumption rate needs to be reduced.

As to the case in item (2), the user may select whether to reduce the power consumption rate on his/her own, for example, the minimum endurance time length is 1 hours, the maximum endurance time length is 5 hours, and the desired endurance time length is 2 hours, in this case, the user may select that there is no need to reduce the power consumption rate. And when the desired endurance time length is 4 hours, the user may select that it needs to reduce the power consumption rate. Accordingly, selectivity is further extended for the user, which further improves user experience.

(3) The desired endurance time length is larger than or equal to the maximum endurance time length, in this case, it is judged in step S103 that it needs to reduce the power consumption rate. In this case, step S104 may specifically comprise determining the power consumption reducing scheme according to the desired endurance time length and the maximum endurance time length and/or the minimum endurance time length.

In practice, although in step S105 management is performed on the mobile terminal according to the power consumption reducing scheme determined in step S104 and the power consumption rate of the mobile terminal is reduced, in order to further ensure that the mobile terminal can last out for the desired endurance time length, during using of the mobile terminal, it may continue to judge whether it needs to further reduce the power consumption rate according to another predetermined time length.

In this case, in step S105, the following steps may be specifically executed: step S1051, judging whether a second ratio of the state of charge at a second predetermined time length after managing is started to the state of charge when predicting the endurance time length is smaller than a third preset ratio; a ratio of the second predetermined time length to the desired endurance time length being a fourth preset ratio, a sum of the third preset ratio and the fourth preset ratio being 1; step S1052, when it is judged that the second ratio is smaller than the third preset ratio, re-determining a power consumption reducing scheme; a degree to which the re-determined power consumption reducing scheme can reduce the power consumption rate is higher than a degree to which the power consumption reducing scheme determined according to the desired endurance time length and the predicted endurance time length can reduce the power consumption rate; and step S1053, managing the mobile terminal according to the re-determined power consumption reducing scheme.

In the present disclosure, the power consumption state of the mobile terminal is monitored in real time during the desired endurance time length, and it is specifically re-judged whether it needs to reduce the power consumption rate according to a radio of the state of charge at one or several time points within the desired endurance time length and the state of charge when predicting the endurance time length, which further ensures that the endurance time length of the mobile terminal can last out for the desired endurance time length.

In practice, a plurality of power consumption reducing schemes may be re-determined in step S1052, in this case, step S1053 may comprise presenting the plurality of re-determined power consumption reducing schemes to the user, receiving a user selection, and managing the mobile terminal according to a power consumption reducing scheme selected by the user.

The present disclosure presents the user with a plurality of re-determined power consumption reducing schemes for the user to select, which further improves user experience.

In practice, the determined or re-determined power consumption reducing scheme may be reducing a CPU operating frequency, reducing a resolution of a display screen, reducing a backlight luminance, shutting down applications running at background, shutting down applications whose power consumption amount is larger than a predetermined power consumption amount, closing sound feedback actions and/or closing tactile feedback actions.

The mobile terminal management method provided by the present disclosure will be further explained in detail in conjunction with a specific scenario.

Figure 2:
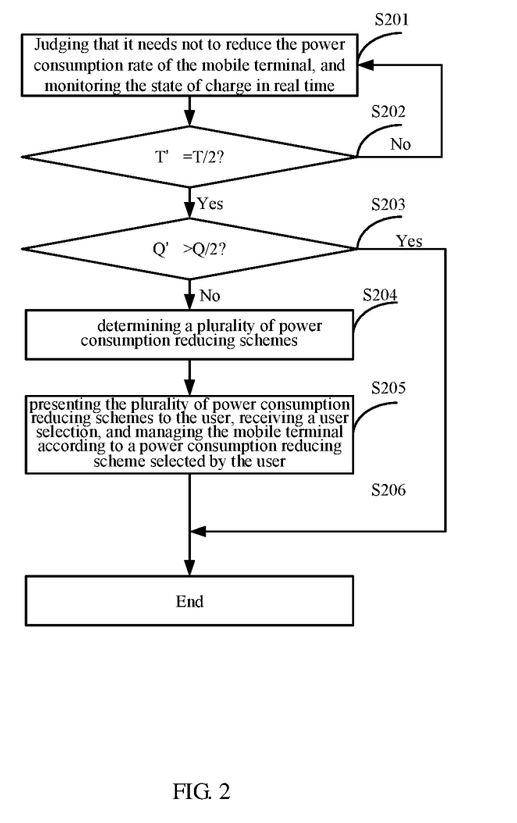
FIG. 2 is a schematic flowchart of another embodiment of the mobile terminal management method according to the present disclosure.

Referring to FIG. 2, it is assumed that the desired endurance time length is T, the state of charge when predicting the endurance time length is Q, the first predetermined time length is T/2, then the second preset ratio is 1/2, the first preset ratio is 1/2. The mobile terminal management method provided in FIG. 2 is that in a case where the desired endurance time length is smaller than or equal to the predicted minimum endurance time length, an optional implementation comprises the following steps: step S201, judging that it does not need to reduce the power consumption rate of the mobile terminal, and monitoring the state of charge in real time; step S202, judging whether the endurance time length T' of the mobile terminal has reached the first predetermined time length T/2, if it has reached T/2, executing the subsequent step S203, otherwise returning to step S201 to continue monitoring the state of charge; step S203, determining whether the state of charge Q' is larger than Q/2, if not, executing the subsequent step S204; step S204, determining a plurality of power consumption reducing schemes according to the state of charge Q' at the first predetermined time length T/2 and the state of charge when predicting the endurance time length; and step S205, presenting the determined plurality of power consumption reducing schemes to the user, receiving a user selection, and managing the mobile terminal according to a power consumption reducing scheme selected by the user.

Optionally, in the embodiment provided in FIG. 2, after step S205, the mobile terminal management method may further continue monitoring the state of charge until it lasts out for the desired endurance time length. In addition, when it is judged in step S203 that the state of charge Q' is larger than Q/2, it may also continue monitoring the state of charge until it lasts out for the desired endurance time length.

In the embodiment provided in FIG. 2, since the desired endurance time length is smaller than or equal to the predicted minimum endurance time length, thus at the beginning no power consumption reducing scheme is provided to reduce the power consumption rate of the mobile terminal, so the user can use the mobile terminal normally. However, the state of charge is monitored within the desired endurance time length, specifically, at T/2, again it is judged whether it needs to reduce the power consumption rate, it is re-determined whether a power consumption reducing scheme is to be provided according to a judgment result, so as to ensure that the mobile terminal can last out for the desired endurance time length. Accordingly, this embodiment ensures that the endurance time length can last out for the desired endurance time length while trying not to affect the user's using, user experience is improved while power is saved.

Figure 3:
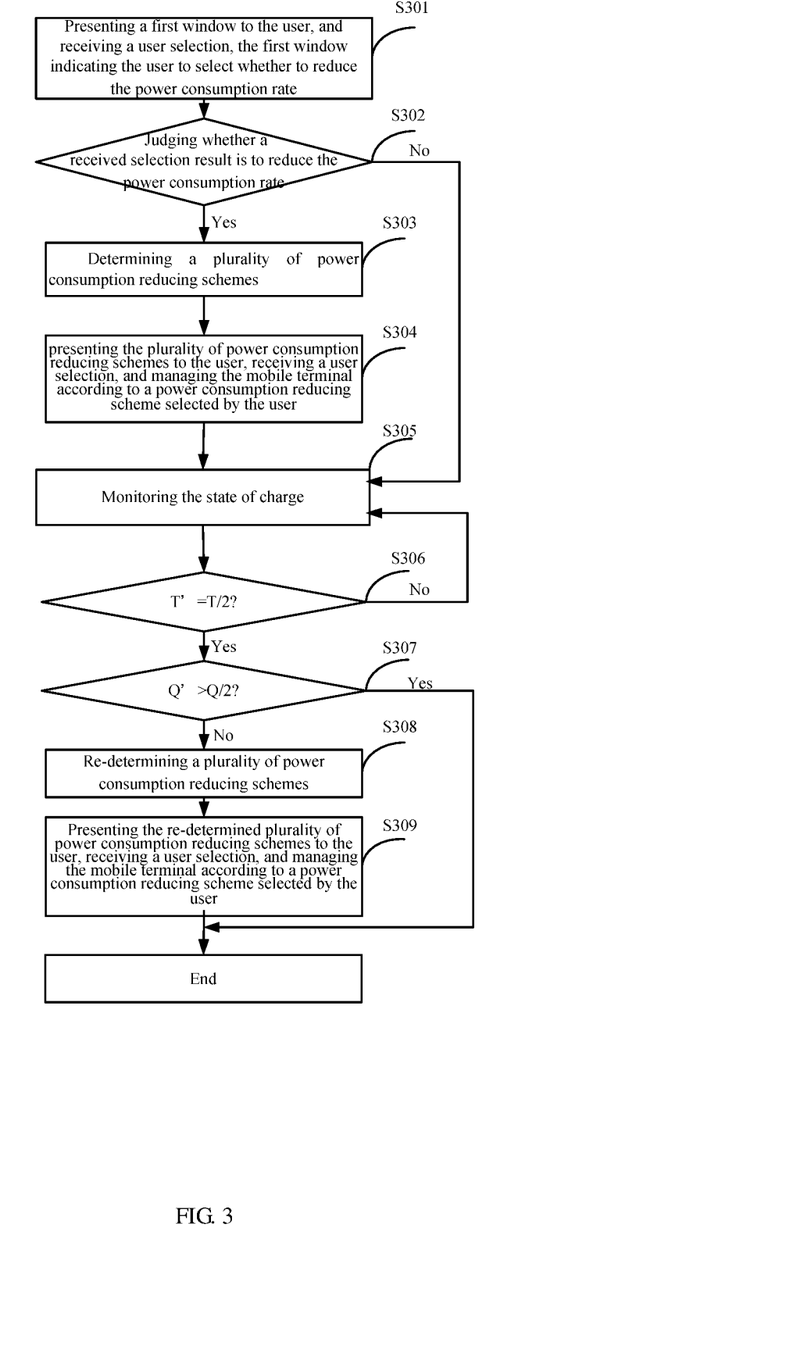
FIG. 3 is a schematic flowchart of yet another embodiment of the mobile terminal management method according to the present disclosure.

Referring to FIG. 3, the desired endurance time length, the state of charge when predicting the endurance time length, and the first predetermined time length all are the same as those assumed in FIG. 2. The mobile terminal management method provided in FIG. 3 is that when the desired endurance time length is larger than the predicted minimum endurance time length and smaller than the predicted maximum endurance time length, an optional implementation comprises the following steps: step S301, presenting a first window to the user, and receiving a user selection, the first window indicating the user to select whether to reduce the power consumption rate; step S302, judging whether a received selection result is to reduce the power consumption rate, if yes, executing the subsequent step S303, otherwise, executing step S305 to monitor the state of charge; step S303, determining a plurality of power consumption reducing schemes; step S304, presenting the determined plurality of power consumption reducing schemes to the user, receiving a user selection, and managing the mobile terminal according to a power consumption reducing scheme selected by the user; step S305, monitoring the state of charge; step S306, judging whether the endurance time length T' has reached the first predetermined time length T/2, if yes, executing the subsequent step S307, otherwise executing step S305 to continue monitoring the state of charge; step S307, judging whether the state of charge Q' at this time is larger than Q/2, if not, executing step S308; step S308, re-determining a plurality of power consumption reducing schemes; and step S309, presenting the re-determined plurality of power consumption reducing schemes to the user, receiving a user selection, and managing the mobile terminal according to a power consumption reducing scheme selected by the user.

Optionally, in the embodiment provided in FIG. 3, after step S309, the mobile terminal management method may further continue monitoring the state of charge until it lasts out for the desired endurance time length. In addition, in step S307, when it is judged that the state of charge Q' is larger than Q/2, it may also continue monitoring the state of charge until it lasts out for the desired endurance time length.

In the embodiment provided in FIG. 3, when the desired endurance time length is larger than the predicted minimum endurance time length and smaller than the predicted maximum endurance time length, the user can select whether it needs to reduce the power consumption rate according to his/her own circumstance, which improves user experience. When the user selects to reduce the power consumption rate, a plurality of power consumption reducing schemes are provided to the user, so that the user can select one power consumption reducing scheme according to his/her own using habits to manage the mobile terminal, which thereby further improves user experience. In addition, the state of charge is still monitored within the desired endurance time length, so as to ensure that the mobile terminal can last out for the desired endurance time length.

When comparing the embodiments provided in FIGS. 2 and 3, it can be seen that step S305 to S309 in the embodiment provided in FIG. 3 are the same as steps S201 to S205 in the embodiment provided in FIG. 2.

It is easy to understand, a degree to which the power consumption reducing scheme re-determined in step S308 can reduce the power consumption rate is higher than a degree to which the power consumption reducing scheme determined in step S303, so that the endurance time length can be extended.

Figure 4:
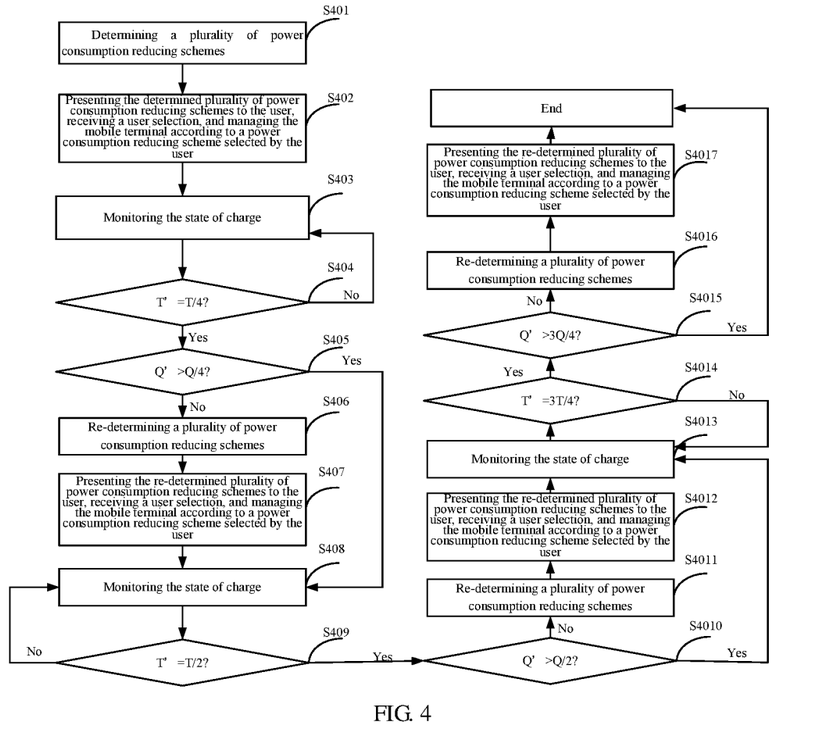
FIG. 4 is a schematic flowchart of still yet another embodiment of the mobile terminal management method according to the present disclosure.

Referring to FIG. 4, the desired endurance time length and the state of charge when predicting the endurance time length both are the same as those assumed in FIG. 2, the first predetermined time length is T/4, the second predetermined time length is T/2, the third predetermined time length is 3T/4. The mobile terminal management method provided in FIG. 4 is that when the desired endurance time length is larger than or equal to the predicted maximum endurance time length, an optional implementation comprises the following steps: step S401, determining a plurality of power consumption reducing schemes; step S402, presenting the determined plurality of power consumption reducing schemes to the user, receiving a user selection, and managing the mobile terminal according to a power consumption reducing scheme selected by the user; step S403, monitoring the state of charge; step S404, judging whether the endurance time length T' has reached the first predetermined time length T/4, if yes, executing step S405, otherwise returning to step S403 to continue monitoring the state of charge; step S405, judging whether the state of charge Q' at the first predetermined time length T/4 is larger than 3Q/4, if yes, proceeding to step S408 to monitor the state of charge, otherwise executing step S406; step S406, re-determining a plurality of power consumption reducing schemes; step S407, presenting the re-determined plurality of power consumption reducing schemes to the user, receiving a user selection, and managing the mobile terminal according to a power consumption reducing scheme selected by the user; step S408, continuing monitoring the state of charge; step S409, judging whether the endurance time length T' has reached the second predetermined time length T/2, if yes, executing step S4010, otherwise returning to step S408 to continue monitoring the state of charge; step S4010, judging whether the state of charge at the second predetermined time length T/2 is larger than Q/2, if yes, proceeding to step S4013 to continue monitoring the state of charge, otherwise executing step S4011; step S4011, re-determining a plurality of power consumption reducing schemes; step S4012, presenting the re-determined plurality of power consumption reducing schemes to the user, receiving a user selection, and managing the mobile terminal according to a power consumption reducing scheme selected by the user; step S4013, continuing monitoring the state of charge; step S4014, judging whether the endurance time length T' has reached the third predicted time length 3T/4, if yes, executing step S4015, otherwise returning to step S4013 to continue monitoring the state of charge; step S4015, judging whether the state of charge Q' at the third predicted time length 3T/4 is larger than Q/4, if not, executing step S4016; step S4016, re-determining a plurality of power consumption reducing schemes; and step S4017, presenting the re-determined plurality of power consumption reducing schemes to the user, receiving a user selection, and managing the mobile terminal according to a power consumption reducing scheme selected by the user.

Optionally, in the embodiment provided in FIG. 4, after step S4017, the mobile terminal management method may further continue monitoring the state of charge until it lasts out for the desired endurance time length. In addition, in step S4015, when it is judged that the state of charge Q' at the third predetermined time length is larger than Q/4, it may also continue monitoring the state of charge until it lasts out for the desired endurance time length.

In this embodiment, a plurality of power consumption reducing schemes are determined at the beginning of and/or during the desired endurance time length, which improves user experience. In this embodiment, three time points are selected to judge whether it needs to reduce the power consumption rate once more, so as to ensure that the mobile terminal has reached the desired endurance time length.

It can be seen that, steps S403 to S407, steps S408 to S4012, step S4013 to S4017 are approximately the same. And it is easy to understand, the degrees to which the power consumption reducing schemes determined in steps S401, S406, S4011, and S4016 can reduce the power consumption rate increase gradually.

The embodiments provided in FIGS. 2, 3, and 4 differ in whether the power consumption rate needs to be reduced at the beginning, in FIG. 2 it is judged that there is no need to reduce the power consumption rate, in FIG. 3 it is that the user selects on his/her own whether it needs to reduce the power consumption rate, in FIG. 4 it is judged that it needs to reduce the power consumption rate. Similarity of the embodiments provided in FIGS. 2, 3, and 4 is that it always needs to monitor the state of charge during the desired endurance time length, and the state of charge is determined at a predetermined time length, and it is re-judged whether it needs to reduce the power consumption rate according to the determined state of charge. In FIG. 4, a plurality of predetermined time lengths are provided, that is, whether it needs to reduce the power consumption rate once more is judged at multiple time points within the desired endurance time length. It is easy to understand, multiple predetermined time lengths may also be set in the embodiments provided in FIGS. 2 and 3 to perform judgment more than one time, so as to ensure that the mobile terminal has reached the desired endurance time length.

Figure 5:
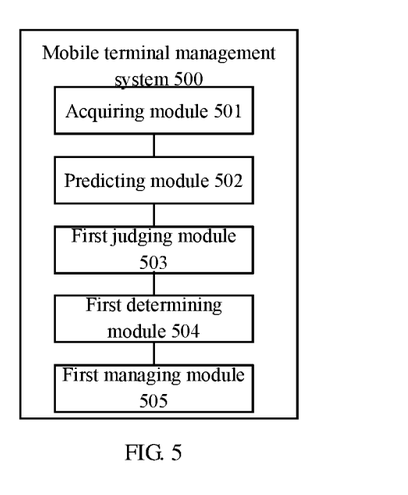
FIG. 5 is a block diagram of structure of the mobile terminal management terminal according to the present disclosure.

Based on the same inventive concept, in the present disclosure, there is further provided a mobile terminal management system 500, as shown in FIG. 5, said system 500 comprises: an acquiring module 501 for acquiring a desired endurance time length set by a user; a predicting module 502 for predicting an endurance time length according to a current power consumption rate and a current state of charge of a battery; a first judging module 503 for judging whether a power consumption rate needs to be reduced according to the desired endurance time length and the predicted endurance time length; a first determining module 504 for, when it is judged that the power consumption rate needs to be reduced, determining a power consumption reducing scheme according to the desired endurance time length and the predicted endurance time length; and a first managing module 505 for managing a mobile terminal according to the power consumption reducing scheme determined by the first determining module 504.

Optionally, the system further comprises the following modules not shown in FIG. 5: a second judging module 506 for, when it is judged that the power consumption rate does not need to be reduced, re-judging whether the power consumption rate needs to be reduced according to a state of charge at a first predetermined time length after predicting the endurance time length and a state of charge when predicting the endurance time length; a second determining module 507 for, when it is re-judged that the power consumption rate needs to be reduced, determining a power consumption reducing scheme according to the state of charge at the first predetermined time length after predicting the endurance time length and the state of charge when predicting the endurance time length; and a second managing module 508 for managing the mobile terminal according to the power consumption reducing scheme determined by the second determining module 507.

Optionally, the second judging module 506 is specifically for: judging whether a first ratio of the state of charge at the first predetermined time length after predicting the endurance time length to the state of charge when predicting the endurance time length is smaller than a first preset ratio; a ratio of the first predetermined time length to the desired endurance time length being a second preset ratio, a sum of the first preset ratio and the second preset ratio being 1; and when the first ratio is smaller than the first preset ratio, judging that the power consumption rate needs to be reduced.

Optionally, said determining a power consumption reducing scheme in the first determining module 504 and/or the second determining module 507 comprises: determining a plurality of power consumption reducing schemes; said managing a mobile terminal according to the determined power consumption reducing scheme in the first managing module 505 and/or the second managing module 508 comprises: presenting the plurality of power consumption reducing schemes to the user, receiving a user selection, and managing the mobile terminal according to a power consumption reducing scheme selected by the user.

Optionally, said determining a power consumption reducing scheme according to the desired endurance time length and the predicted endurance time length in the first determining module 504 comprises: determining the power consumption reducing scheme according to a ratio of the desired endurance time length to the predicted endurance time length, the ratio of the desired endurance time length to the predicted endurance time length being positively correlated with a degree to which the power consumption reducing scheme can reduce the power consumption rate.

Optionally, the predicting module 502 is specifically for predicting a maximum endurance time length and a minimum endurance time length according to the current power consumption rate and the current state of charge of the battery; the first judging module 503 is specifically for, when the desired endurance time length is larger than or equal to the maximum endurance time length, judging that the power consumption rate needs to be reduced; and the first determining module 504 is specifically for determining the power consumption reducing scheme according to the desired endurance time length and the maximum endurance time length and/or the minimum endurance time length.

Optionally, the first judging module 503 is specifically further for: when the desired endurance time length is smaller than the maximum endurance time length and larger than the minimum endurance time length, presenting a first window to the user, the first window being used to indicate the user to choose whether to reduce the power consumption rate; receiving a user selection; and when the user selects to reduce the power consumption rate, judging that the power consumption rate needs to be reduced.

Optionally, the first managing module 505 is specifically further for: judging whether a second ratio of the state of charge at a second predetermined time length after managing is started to the state of charge when predicting the endurance time length is smaller than a third preset ratio; a ratio of the second predetermined time length to the desired endurance time length being a fourth preset ratio, a sum of the third preset ratio and the fourth preset ratio being 1; when it is determined that the second ratio is smaller than the third preset ratio, re-determining a power consumption reducing scheme; a degree to which the re-determined power consumption reducing scheme can reduce the power consumption rate is higher than a degree to which the power consumption reducing scheme determined according to the desired endurance time length and the predicted endurance time length can reduce the power consumption rate; and managing the mobile terminal according to the re-determined power consumption reducing scheme.

Optionally, said re-determining a power consumption reducing scheme in the first managing module 505 comprises: re-determining a plurality of power consumption reducing schemes; said managing the mobile terminal according to the re-determined power consumption reducing scheme in the first managing module 505 comprises: presenting the plurality of re-determined power consumption reducing schemes to the user, receiving a user selection, and managing the mobile terminal according to a power consumption reducing scheme selected by the user.

In the present disclosure, there is further provided a mobile terminal comprising any of the mobile terminal management system described above.

The mobile terminal management system provided by the present disclosure is a functional framework module of the mobile terminal management method, as for explanations, descriptions, and advantageous effects of the related parts, reference made be made to the related parts of the mobile terminal management method provided by the present disclosure, no more details are repeated here.

Although the preferred embodiments of the present disclosure have been described, those skilled in the art can make various modifications and variations to these embodiments without departing from the spirit and scope of the present disclosure, such modifications and variations all fall into the scope defined by the attached claims.

What is claimed is:

1. A mobile terminal management method, comprising:
acquiring a desired duration set by a user;
acquiring a power consumption rate and a state of charge of a battery as a first power consumption rate and a first state of charge;
predicting a duration according to the first power consumption rate and the first state of charge;
judging whether the power consumption rate needs to be reduced according to the desired duration and the predicted duration;
when it is judged that the power consumption rate needs to be reduced, determining a power consumption reducing scheme according to the desired duration and the predicted duration; and managing a mobile terminal according to the determined power consumption reducing scheme;
when it is judged that the power consumption rate does not need to be reduced, acquiring a state of charge of the battery as a second state of charge after a first predetermined time length from said predicting the duration; re-judging whether the power consumption rate needs to be reduced according to the second state of charge and the first state of charge,
wherein said re-judging whether the power consumption rate needs to be reduced according to the second state of charge and the first state of charge comprises:
judging whether a first ratio of the second state of charge to the first state of charge is smaller than a first preset ratio; a ratio of the first predetermined time length to the desired duration being a second preset ratio, a sum of the first preset ratio and the second preset ratio being 1; and
when the first ratio is smaller than the first preset ratio, judging that the power consumption rate needs to be reduced.

2. The mobile terminal management method according to claim 1, further comprising:
when it is re-judged that the power consumption rate needs to be reduced,
determining a power consumption reducing scheme according to the second state of charge and the first state of charge; and
managing the mobile terminal according to the power consumption reducing scheme determined according to the second state of charge and the first state of charge.

3. The mobile terminal management method according to claim 1, wherein
said determining a power consumption reducing scheme comprises: determining a plurality of power consumption reducing schemes; and
said managing a mobile terminal according to the determined power consumption reducing scheme comprises: presenting the plurality of power consumption reducing schemes to the user, receiving a user selection, and managing the mobile terminal according to a power consumption reducing scheme selected by the user.

4. The mobile terminal management method according to claim 1, wherein said determining a power consumption reducing scheme according to the desired duration and the predicted duration comprises:
determining the power consumption reducing scheme according to a ratio of the desired duration to the predicted duration, the ratio of the desired duration to the predicted duration being positively correlated with a degree to which the power consumption reducing scheme can reduce the power consumption rate.

5. The mobile terminal management method according to claim 1, wherein
said predicting the duration according to the first power consumption rate and the first state of charge comprises: predicting a maximum duration and a minimum duration according to the first power consumption rate and the first state of charge;
said judging whether the power consumption rate needs to be reduced according to the desired duration and the predicted duration comprises: when the desired duration is larger than or equal to the maximum duration, judging that the power consumption rate needs to be reduced; and
said determining the power consumption reducing scheme according to the desired duration and the predicted duration comprises: determining the power consumption reducing scheme according to the desired duration and the maximum duration and/or the minimum duration.

6. The mobile terminal management method according to claim 5, wherein said judging whether the power consumption rate needs to be reduced according to the desired duration and the predicted duration further comprises:
when the desired duration is smaller than the maximum duration and larger than the minimum duration, presenting a first window to the user, the first window being used to indicate the user to choose whether to reduce the power consumption rate;
receiving a user selection; and
when the user selects to reduce the power consumption rate, judging that the power consumption rate needs to be reduced.

7. The mobile terminal management method according to claim 1, wherein said managing the mobile terminal according to the determined power consumption reducing scheme comprises:
acquiring a state of charge of the battery as a third state of charge after a second predetermined time length from the beginning of managing the mobile terminal;
judging whether a second ratio of the third state of charge to the first state of charge is smaller than a third preset ratio; a ratio of the second predetermined time length to the desired duration being a fourth preset ratio, a sum of the third preset ratio and the fourth preset ratio being 1;

when it is determined that the second ratio is smaller than the third preset ratio, re-determining a power consumption reducing scheme, wherein a degree to which the re-determined power consumption reducing scheme can reduce the power consumption rate is higher than a degree to which the power consumption reducing scheme determined according to the desired duration and the predicted duration can reduce the power consumption rate; and managing the mobile terminal according to the re-determined power consumption reducing scheme.

8. The mobile terminal management method according to claim 7, wherein said re-determining the power consumption reducing scheme comprises: re-determining a plurality of power consumption reducing schemes;

said managing the mobile terminal according to the re-determined power consumption reducing scheme comprises: presenting the plurality of re-determined power consumption reducing schemes to the user, receiving a user selection, and managing the mobile terminal according to a power consumption reducing scheme selected by the user.

9. A mobile terminal management system, comprising:

an acquiring module for acquiring a desired duration set by a user;

a predicting module for acquiring a power consumption rate and a state of charge of a battery as a first power consumption rate and a first state of charge, predicting a duration according to the first power consumption rate and the first state of charge;

a first judging module for judging whether the power consumption rate needs to be reduced according to the desired duration and the predicted duration;

a first determining module for, when it is judged that the power consumption rate needs to be reduced, determining a power consumption reducing scheme according to the desired duration and the predicted duration;

a first managing module for managing a mobile terminal according to the power consumption reducing scheme determined by the first determining module; and a second judging module for, when it is judged that the power consumption rate does not need to be reduced, acquiring a state of charge of the battery as a second state of charge after a first predetermined time length from said predicting the duration; re-judging whether the power consumption rate needs to be reduced according to the second state of charge and the first state of charge, wherein the second judging module is for:

judging whether a first ratio of the second state of charge to the first state of charge is smaller than a first preset ratio; a ratio of the first predetermined time length to the desired duration being a second preset ratio, a sum of the first preset ratio and the second preset ratio being 1; and when the first ratio is smaller than the first preset ratio, judging that the power consumption rate needs to be reduced.

10. The mobile terminal management system according to claim 9, further comprising:

a second determining module for, when it is re-judged that the power consumption rate needs to be reduced, determining a power consumption reducing scheme according to the second state of charge and the first state of charge; and a second managing module for managing the mobile terminal according to the power consumption reducing scheme determined by the second determining module.

11. The mobile terminal management system according to claim 9, wherein said determining a power consumption reducing scheme in the first determining module and/or the second determining module comprises: determining a plurality of power consumption reducing schemes;

said managing a mobile terminal according to the determined power consumption reducing scheme in the first managing module and/or the second managing module comprises: presenting the plurality of power consumption reducing schemes to the user, receiving a user selection, and managing the mobile terminal according to a power consumption reducing scheme selected by the user.

12. The mobile terminal management system according to claim 9, wherein said determining a power consumption reducing scheme according to the desired duration and the predicted duration in the first determining module comprises:

determining the power consumption reducing scheme according to a ratio of the desired duration to the predicted duration, the ratio of the desired duration to the predicted duration being positively correlated with a degree to which the power consumption reducing scheme can reduce the power consumption rate.

13. The mobile terminal management system according to claim 9, wherein the predicting module predicts a maximum duration and a minimum duration according to the first power consumption rate and the first state of charge;

when the desired duration is larger than or equal to the maximum duration, the first judging module judges that the power consumption rate needs to be reduced; and the first determining module determines the power consumption reducing scheme according to the desired duration and the maximum duration and/or the minimum duration.

14. The mobile terminal management system according to claim 13, wherein the first judging module is further for:

when the desired duration is smaller than the maximum duration and larger than the minimum duration, presenting a first window to the user, the first window being used to indicate the user to choose whether to reduce the power consumption rate; receiving a user selection; and when the user selects to reduce the power consumption rate, judging that the power consumption rate needs to be reduced.

15. The mobile terminal management system according to claim 9, wherein the first managing module is further for:

acquiring a state of charge of the battery as a third state of charge after a second predetermined time length from the beginning of managing the mobile terminal;

judging whether a second ratio of the third state of charge to the first state of charge is smaller than a third preset ratio; a ratio of the second predetermined time length to the desired duration being a fourth preset ratio, a sum of the third preset ratio and the fourth preset ratio being 1;

when it is determined that the second ratio is smaller than the third preset ratio, re-determining a power consumption reducing scheme, wherein a degree to which the re-determined power consumption reducing scheme can reduce the power consumption rate is higher than a degree to which the power consumption reducing scheme determined according to the desired duration and the predicted duration can reduce the power consumption rate; and managing the mobile terminal according to the re-determined power consumption reducing scheme.

16. The mobile terminal management system according to claim 15, wherein said re-determining the power consumption reducing scheme in the first managing module comprises: re-determining a plurality of power consumption reducing schemes; and said managing the mobile terminal according to the re-determined power consumption reducing scheme in the first managing module comprises: presenting the plurality of re-determined power consumption reducing schemes to the user, receiving a user selection, and managing the mobile terminal according to a power consumption reducing scheme selected by the user.

17. A mobile terminal, comprising the mobile terminal managing system according to claim 9.

18. A mobile terminal management method, comprising:
acquiring a desired duration set by a user;
acquiring a power consumption rate and a state of charge of a battery as a first power consumption rate and a first state of charge;
predicting a duration according to the first power consumption rate and the first state of charge;
judging whether the power consumption rate needs to be reduced according to the desired duration and the predicted duration;
when it is judged that the power consumption rate needs to be reduced, determining a power consumption reducing scheme according to the desired duration and the predicted duration; and managing a mobile terminal according to the determined power consumption reducing scheme;
when it is judged that the power consumption rate does not need to be reduced, acquiring a state of charge of the battery as a second state of charge after a first predetermined time length from said predicting the duration; re-judging whether the power consumption rate needs to be reduced according to the second state of charge and the first state of charge,
said predicting the duration according to the first power consumption rate and the first state of charge comprises: predicting a maximum duration and a minimum duration according to the first power consumption rate and the first state of charge;
said judging whether the power consumption rate needs to be reduced according to the desired duration and the predicted duration comprises: when the desired duration is larger than or equal to the maximum duration, judging that the power consumption rate needs to be reduced; and
said determining the power consumption reducing scheme according to the desired duration and the predicted duration comprises: determining the power consumption reducing scheme according to the desired duration and the maximum duration and/or the minimum duration.

19. The mobile terminal management method according to claim 18, further comprising:
when it is re-judged that the power consumption rate needs to be reduced, determining a power consumption reducing scheme according to the second state of charge and the first state of charge; and
managing the mobile terminal according to the power consumption reducing scheme determined according to the second state of charge and the first state of charge.

20. The mobile terminal management method according to claim 18, wherein said re-judging whether the power consumption rate needs to be reduced according to the second state of charge and the first state of charge comprises:
judging whether a first ratio of the second state of charge to the first state of charge is smaller than a first preset ratio; a ratio of the first predetermined time length to the desired duration being a second preset ratio, a sum of the first preset ratio and the second preset ratio being 1; and
when the first ratio is smaller than the first preset ratio, judging that the power consumption rate needs to be reduced.

21. The mobile terminal management method according to claim 18, wherein said determining a power consumption reducing scheme comprises:
determining a plurality of power consumption reducing schemes; and
said managing a mobile terminal according to the determined power consumption reducing scheme comprises: presenting the plurality of power consumption reducing schemes to the user, receiving a user selection, and managing the mobile terminal according to a power consumption reducing scheme selected by the user.

22. The mobile terminal management method according to claim 18, wherein said determining a power consumption reducing scheme according to the desired duration and the predicted duration comprises:
determining the power consumption reducing scheme according to a ratio of the desired duration to the predicted duration, the ratio of the desired duration to the predicted duration being positively correlated with a degree to which the power consumption reducing scheme can reduce the power consumption rate.

23. The mobile terminal management method according to claim 18, wherein said judging whether the power consumption rate needs to be reduced according to the desired duration and the predicted duration further comprises:
when the desired duration is smaller than the maximum duration and larger than the minimum duration, presenting a first window to the user, the first window being used to indicate the user to choose whether to reduce the power consumption rate;
receiving a user selection; and
when the user selects to reduce the power consumption rate, judging that the power consumption rate needs to be reduced.

24. The mobile terminal management method according to claim 18, wherein said managing the mobile terminal according to the determined power consumption reducing scheme comprises:
acquiring a state of charge of the battery as a third state of charge after a second predetermined time length from the beginning of managing the mobile terminal;
judging whether a second ratio of the third state of charge to the first state of charge is smaller than a third preset ratio; a ratio of the second predetermined time length to the desired duration being a fourth preset ratio, a sum of the third preset ratio and the fourth preset ratio being 1;

when it is determined that the second ratio is smaller than the third preset ratio, re-determining a power consumption reducing scheme, wherein a degree to which the re-determined power consumption reducing scheme can reduce the power consumption rate is higher than a degree to which the power consumption reducing scheme determined according to the desired duration and the predicted duration can reduce the power consumption rate; and managing the mobile terminal according to the re-determined power consumption reducing scheme.

25. The mobile terminal management method according to claim 24, wherein
said re-determining the power consumption reducing scheme comprises: re-determining a plurality of power consumption reducing schemes;
said managing the mobile terminal according to the re-determined power consumption reducing scheme comprises: presenting the plurality of re-determined power consumption reducing schemes to the user, receiving a user selection, and managing the mobile terminal according to a power consumption reducing scheme selected by the user.

26. A mobile terminal management system, comprising:
an acquiring module for acquiring a desired duration set by a user;
a predicting module for acquiring a power consumption rate and a state of charge of a battery as a first power consumption rate and a first state of charge, predicting a duration according to the first power consumption rate and the first state of charge;
a first judging module for judging whether the power consumption rate needs to be reduced according to the desired duration and the predicted duration;
a first determining module for, when it is judged that the power consumption rate needs to be reduced, determining a power consumption reducing scheme according to the desired duration and the predicted duration;
a first managing module for managing a mobile terminal according to the power consumption reducing scheme determined by the first determining module; and
a second judging module for, when it is judged that the power consumption rate does not need to be reduced, acquiring a state of charge of the battery as a second state of charge after a first predetermined time length from said predicting the duration; re-judging whether the power consumption rate needs to be reduced according to the second state of charge and the first state of charge, wherein,
the predicting module predicts a maximum duration and a minimum duration according to the first power consumption rate and the first state of charge;
when the desired duration is larger than or equal to the maximum duration, the first judging module judges that the power consumption rate needs to be reduced; and
the first determining module determines the power consumption reducing scheme according to the desired duration and the maximum duration and/or the minimum duration.

27. The mobile terminal management system according to claim 26, further comprising:
a second determining module for, when it is re-judged that the power consumption rate needs to be reduced, determining a power consumption reducing scheme according to the second state of charge and the first state of charge; and a second managing module for managing the mobile terminal according to the power consumption reducing scheme determined by the second determining module.

28. The mobile terminal management system according to claim 27, wherein the second judging module is for:
judging whether a first ratio of the second state of charge to the first state of charge is smaller than a first preset ratio; a ratio of the first predetermined time length to the desired duration being a second preset ratio, a sum of the first preset ratio and the second preset ratio being 1; and
when the first ratio is smaller than the first preset ratio, judging that the power consumption rate needs to be reduced.

29. The mobile terminal management system according to claim 26, wherein
said determining a power consumption reducing scheme in the first determining module and/or the second determining module comprises: determining a plurality of power consumption reducing schemes;
said managing a mobile terminal according to the determined power consumption reducing scheme in the first managing module and/or the second managing module comprises: presenting the plurality of power consumption reducing schemes to the user, receiving a user selection, and managing the mobile terminal according to a power consumption reducing scheme selected by the user.

30. The mobile terminal management system according to claim 26, wherein said determining a power consumption reducing scheme according to the desired duration and the predicted duration in the first determining module comprises:
determining the power consumption reducing scheme according to a ratio of the desired duration to the predicted duration, the ratio of the desired duration to the predicted duration being positively correlated with a degree to which the power consumption reducing scheme can reduce the power consumption rate.

31. The mobile terminal management system according to claim 26, wherein the first judging module is further for:
when the desired duration is smaller than the maximum duration and larger than the minimum duration, presenting a first window to the user, the first window being used to indicate the user to choose whether to reduce the power consumption rate; receiving a user selection; and when the user selects to reduce the power consumption rate, judging that the power consumption rate needs to be reduced.

32. The mobile terminal management system according to claim 26, wherein the first managing module is further for:
acquiring a state of charge of the battery as a third state of charge after a second predetermined time length from the beginning of managing the mobile terminal;
judging whether a second ratio of the third state of charge to the first state of charge is smaller than a third preset ratio; a ratio of the second predetermined time length to the desired duration being a fourth preset ratio, a sum of the third preset ratio and the fourth preset ratio being 1;
when it is determined that the second ratio is smaller than the third preset ratio, re-determining a power consumption reducing scheme, wherein a degree to which the re-determined power consumption reducing scheme can reduce the power consumption rate is higher than a degree to which the power consumption reducing scheme determined according to the desired duration and the predicted duration can reduce the power consumption rate; and managing the mobile terminal according to the re-determined power consumption reducing scheme.

33. The mobile terminal management system according to claim 32, wherein said re-determining the power consumption reducing scheme in the first managing module comprises: re-determining a plurality of power consumption reducing schemes; and said managing the mobile terminal according to the re-determined power consumption reducing scheme in the first managing module comprises: presenting the plurality of re-determined power consumption reducing schemes to the user, receiving a user selection, and managing the mobile terminal according to a power consumption reducing scheme selected by the user.

34. A mobile terminal, comprising the mobile terminal managing system according to claim 26.

* * * * *